(12) United States Patent
Lee et al.

(10) Patent No.: US 8,009,895 B2
(45) Date of Patent: Aug. 30, 2011

(54) SEMICONDUCTOR WAFER ANALYSIS SYSTEM

(75) Inventors: Chang-Huhn Lee, Gyeonggi-do (KR); Seok-Woo Hong, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1251 days.

(21) Appl. No.: 11/618,360

(22) Filed: Dec. 29, 2006

(65) Prior Publication Data

US 2007/0211932 A1  Sep. 13, 2007

(30) Foreign Application Priority Data

Dec. 29, 2005  (KR) .................. 10-2005-0133922

(51) Int. Cl.
*G06K 9/00* (2006.01)
(52) U.S. Cl. .............. 382/145; 324/750.01; 324/757.03; 324/762.05; 382/144
(58) Field of Classification Search .................. 324/762, 324/765, 750.01, 757.03, 762.05; 382/145, 382/144
See application file for complete search history.

(56) References Cited

U.S. PATENT DOCUMENTS

| | | | | |
|---|---|---|---|---|
| 6,392,434 B1 * | 5/2002 | Chiu | ............................ | 324/765 |
| 6,407,373 B1 * | 6/2002 | Dotan | ........................ | 250/201.3 |
| 6,507,800 B1 * | 1/2003 | Sheu | ............................ | 702/117 |
| 6,727,723 B2 * | 4/2004 | Shimizu et al. | .......... | 324/750.05 |
| 7,075,098 B2 * | 7/2006 | Ikeda et al. | ................. | 250/559.3 |
| 7,221,991 B2 * | 5/2007 | Matsushita et al. | ........... | 700/110 |
| 2002/0121915 A1 * | 9/2002 | Alonso Montull et al. | ... | 324/765 |
| 2005/0004774 A1 * | 1/2005 | Volk et al. | ..................... | 702/108 |
| 2005/0102591 A1 * | 5/2005 | Matsushita et al. | ........... | 714/724 |
| 2006/0238755 A1 * | 10/2006 | Shibuya et al. | ............ | 356/237.4 |
| 2007/0061637 A1 * | 3/2007 | Ward et al. | .................... | 714/718 |

FOREIGN PATENT DOCUMENTS

| | | |
|---|---|---|
| JP | 10-214866 | 8/1998 |
| JP | 2001-156135 | 6/2001 |
| KR | 2005-0068119 | 7/2005 |

OTHER PUBLICATIONS

English language abstract of Korean Publication 2005-0068119, May 7, 2005.
English language abstract of Japanese Publication No. 10-214866, Nov. 8, 1998.

* cited by examiner

*Primary Examiner* — Gregory M Desire
(74) *Attorney, Agent, or Firm* — F. Chau & Associates, LLC

(57) ABSTRACT

A semiconductor wafer analysis system is provided. In an embodiment, the semiconductor wafer analysis system includes a tester to test semiconductor wafers manufactured by at least one manufacturing facility, a wafer map generation module to generate wafer maps on the basis of the test results from the tester, and a wafer analysis module. The wafer analysis module may include a data generation module that divides each wafer map into a plurality of defect analysis regions and generates feature vectors representing the semiconductor wafers, and an operation module that statistically analyzes the feature vectors.

20 Claims, 2 Drawing Sheets

SEMICONDUCTOR WAFER ANALYSIS SYSTEM

CROSS-REFERENCE TO RELATED APPLICATION

This application claims priority from Korean Patent Application No. 10-2005-0133922 filed on Dec. 29, 2005 in the Korean Intellectual Property Office, the disclosure of which is incorporated herein by reference in its entirety.

BACKGROUND

1. Field of the Invention

Embodiments of the present invention, disclosed herein, relate to a semiconductor wafer analysis system and a method of controlling the system, and more particularly, to a semiconductor wafer analysis system for analyzing and examining specific data of wafers.

2. Description of the Related Art

A process of manufacturing semiconductors generally includes a pre-process, a post-process, and a test process. The pre-process is also referred to as a fabrication process of forming integrated circuit patterns on a semiconductor wafer made of single crystal silicon, while the post-process is referred to as an assembly process of separating each chip from the semiconductor wafer and of forming integrated circuit packages so that the chip can be electrically connected to an external device.

After the fabrication process (pre-process) is completed, the test process is performed to test whether the chips separated from the semiconductor wafer are normally operable by using a predetermined test apparatus, and then sorting the chips into non-defective chips and defective chips. In this case, defect analysis processes for detecting defects on the entire surface of the semiconductor wafer and sorting the detected defects are performed.

Meanwhile, the semiconductor wafer defects caused by problems or defects of manufacturing facilities may repeatedly occur in the same region or a specific region of the semiconductor wafer. In this case, however, conventional analysis of wafer maps causes a tester to determine that the defects of the semiconductor wafer are caused by the defects of each chip die, that is, the characteristic defects of each chip. Accordingly, it is difficult to clearly determine whether the defects of the semiconductor wafer are caused by the characteristic defects of each chip or the defects of the facilities that process the chips. This uncertainty makes it difficult to remove the cause of the defects. Lacking a determination of the problem, the defects of the semiconductor wafer may repeatedly occur in a specific area of the manufacturing facilities. This causes the yield of semiconductors to deteriorate.

SUMMARY

An aspect of embodiments of the invention is to provide a semiconductor wafer analysis system for determining defective facilities that are considered to cause defects to occur in specific defect analysis regions of the semiconductor wafer.

Aspects of the embodiments are not limited to those mentioned above, and other aspects of the present invention will be apparently understood by those skilled in the art through the following description.

According to an embodiment, a semiconductor wafer analysis system includes a tester testing semiconductor wafers manufactured by at least one manufacturing facility, a wafer map generation module generating wafer maps on the basis of the test results from the tester, and a wafer analysis module including a data generation module and an operation module. The data generation module divides each wafer map into a plurality of defect analysis regions and generates feature vectors representing the semiconductor wafers. The operation module statistically analyzes the feature vectors.

According to another embodiment, a semiconductor wafer analysis system includes a tester testing semiconductor wafers manufactured by at least one manufacturing facility, a wafer map generation module generating wafer maps on the basis of the test results from the tester, and a wafer analysis module including a data generation module and an operation module. The data generation module divides each wafer map into a plurality of defect analysis regions and generates feature vectors representing the semiconductor wafers. The operation module classifies the feature vectors into clusters based on the defect types by k-means clustering, and determines whether a specific kind of defect occurs in each manufacturing facility by a chi-square analysis method.

According to still another embodiment, a semiconductor wafer analysis system includes a tester testing semiconductor wafers manufactured by at least one manufacturing facility, a wafer map generation module generating wafer maps on the basis of the test results from the tester, and a wafer analysis module dividing each wafer map into a plurality of defect analysis regions and statistically analyzing data of each defect analysis region.

BRIEF DESCRIPTION OF THE DRAWINGS

The above and other features and advantages of the present invention will become more apparent by describing in detail preferred embodiments thereof with reference to the attached drawings, in which.

DESCRIPTION OF THE PREFERRED EMBODIMENTS

Figure 1:
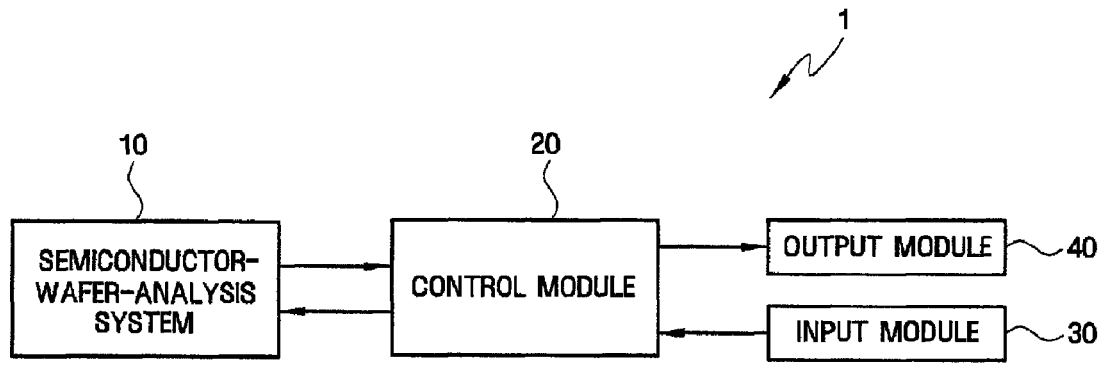
FIG. 1 is a block diagram of a semiconductor wafer analysis control system according to an embodiment of the invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

A semiconductor wafer analysis system according to an embodiment of the invention divides each wafer map into a plurality of defect analysis regions, generates feature vectors, and statistically analyzes the feature vectors so as to determine defective facilities.

FIG. 1 is a block diagram of a semiconductor wafer analysis control system according to an embodiment.

A semiconductor wafer analysis control system 1 includes a semiconductor wafer analysis system 10, a control module 20, an input module 30, and an output module 40.

In the embodiment, the semiconductor wafer analysis system 10 generates feature vectors by analyzing data of semiconductor wafer maps to determine defective facilities using various methods. The semiconductor wafer analysis system 10 may actually perform the analysis, but the control module 20 may select a method that is used for the analysis. In other words, the control module 20 can select and control the analysis method to be performed by the semiconductor wafer analysis system 10. Analysis results are provided to the output module 40.

Meanwhile, although the control module 20 can select the analysis method, the selection of the analysis method may be determined by the input of the input module 30 on the basis of a user's needs. Accordingly, a user can visually analyze the data using a graph or a chart.

Figure 2:
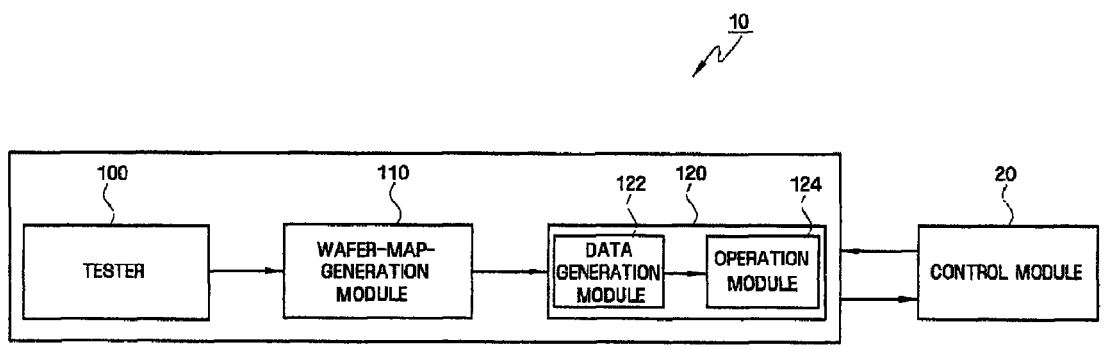
FIG. 2 is a detailed block diagram of a semiconductor wafer analysis system shown in FIG. 1.

FIG. 2 is a detailed block diagram of the semiconductor wafer analysis system 10 shown in FIG. 1.

Referring to FIG. 2, the semiconductor wafer analysis system 10, according to the embodiment, includes a tester 100, a wafer map generation module 110, and a wafer analysis module 120.

The tester 100 tests whether defects are present on the semiconductor wafers manufactured by at least one manufacturing facility, and then determines the type of defects.

Semiconductor wafers are manufactured by a plurality of manufacturing facilities. After all manufacturing processes are completed, the tester 100 tests each of the chip dies of the semiconductor wafers to detect whether defects are present on each chip die and to determine the type of defects. Here, the type of defects may be category or parameter type defects. Specifically, the category type defects may be defective category BIN data defining whether the chip dies are good die or bad die. For example, the BIN data may be classified into BIN 1 indicating good (non-defective) dies, BIN 2 indicating dies with short fail, and BIN 3 indicating dies with open fail. The parameter type defects may be data wherein a reference voltage $V_{ref}$, a threshold voltage $V_t$, a capacitance, or the like, showing characteristics of each chip die, is lower than a predetermined reference value.

Therefore, it is possible to obtain results with respect to the presence and type of defect by testing each semiconductor wafer with the tester 100.

Hereinafter, the BIN data of the wafer maps will be described in an example of an embodiment, but data is not limited to BIN data as described above.

The wafer map generation module 110 generates wafer maps based on results from the tester 100. The wafer maps may be classified on the basis of the shapes of the wafers and the chip dies. The results of the test are associated with and written to the chip dies. Here, the results of the test may be the defective category BIN data. Accordingly, the wafer maps may visually display the type of defect, which may be stored in the wafer maps along with the results of the defects.

However, if the defects do not randomly occur in each chip die, but occur only in a specific region of each chip die, the manufacturing facilities must be considered as the cause of defects. This is because the defects of the semiconductor wafer caused by the manufacturing facilities may repeatedly occur in the same region or a specific region of the semiconductor wafer. In this example, however, the analysis result of the wafer maps causes a tester to determine that the defects of the semiconductor wafer are caused by the defects of each chip die, that is, the characteristic defects of each chip.

Accordingly, it is difficult to clearly determine whether the defects of the semiconductor wafers are caused by the characteristic defects of each chip or the defects of the facilities, by only the analysis results of the wafer maps.

The wafer analysis module 120 can statistically analyze data for a plurality of defect analysis regions of the wafer maps. The wafer analysis module 120 includes a data generation module 122 and an operation module 124.

In this embodiment, the data generation module 122 divides each wafer map into a plurality of defect analysis regions, and generates feature vectors having defect values, which represent at least one defect type occurring in each defect analysis region, as a plurality of component values. A user can optionally define the defect analysis regions.

Figure 3:
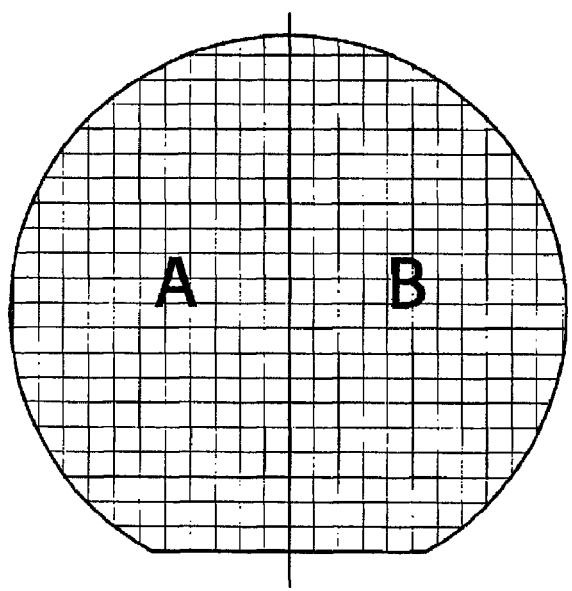
FIG. 3 is a view illustrating defect analysis regions of a semiconductor wafer map.

FIG. 3 shows a typical semiconductor wafer divided into two defect analysis regions. A wafer map is exemplarily divided into two defect analysis regions A and B in the embodiment, but the invention is not limited thereto. Alternatively, the wafer map may be divided into a plurality of defect analysis regions according to a user's input.

In addition, the defect types in the divided defect analysis regions A and B may be used to set the category type defects, that is, BIN data. For example, defect BIN data may be BIN 2 or BIN 3. Further, the incidence of the BIN 2 or BIN 3 in each defect analysis region can be set as a defect value. For example, the number of the BIN 2 data may be 20 and the number of the BIN 3 data may be 30 in the defect analysis region A including one hundred of the chip dies. Furthermore, the number of the BIN 2 data may be 10 and the number of the BIN 3 data may be 20 in the defect analysis region B including one hundred of the chip dies. Accordingly, the amount of the incidence of BIN 2 is 0.2 (20/100), and that of BIN 3 is 0.3 (30/100) in the defect analysis region A. For defect analysis region B, the amount of the incidence of BIN 2 is 0.1, and that of BIN 3 is 0.2. Therefore, it is possible to obtain the defect amount of the incidences of BIN 2 and BIN 3 in each of the defect analysis regions A and B.

If the defect types are set as parameter type defects, the defect values may be mean values of various parameter values. As an example, for a threshold voltage $V_t$ and a reference voltage $V_{ref}$, a mean value of the threshold voltage $V_t$ may be 0.5 V and a mean value of the reference voltage $V_{ref}$ may be 1.5 V in the defect analysis region A. For the defect analysis region B, a mean value of the threshold voltage $V_t$ may be 0.4 V and a mean value of the reference voltage $V_{ref}$ may be 1.3 V. The defect values serve as values that represent at least one defect type occurring in each defect analysis region.

The data generation module 122 can generate feature vectors that include the defect values, which represent at least one defect type occurring in each defect analysis region, as a plurality of component values.

That is, to continue the example above for BIN 2 and BIN 3 of the divided regions A and B, four-dimensional feature vectors having $V_1=(0.2, 0.3, 0.1, 0.2)$ may be generated. (Here, $V_1$ means vector $1^{st}$ and 0.2, 0.3, 0.1, 0.2 means BIN2, BIN3 values of each A, B area).

The operation module 124 clusters a plurality of feature vectors to classify the feature vectors on the basis of the defect types, and may determine whether a specific defect type occurs in each manufacturing facility. The clusters may be classified on the basis of the defect types. For example, the defect types may include a bottom defect in which defects are concentrated on the bottom of the semiconductor wafer, a right defect in which defects are concentrated on the right side of the semiconductor wafer, and a right-bottom defect in which defects are concentrated on the bottom and the right side of the semiconductor wafer.

The wafer may be divided into the defect analysis regions as described above, and the feature vectors may be generated as the defect values representing at least one defect type occurring in each defect analysis region. In addition, the grouping may be based on the feature vectors. In turn, the clusters can be determined on the basis of the defect types. That is, the defect types can be classified into the defect types of specific regions.

A k-means clustering algorithm, a self-organizing map clustering algorithm, a hierarchical clustering algorithm, or the like may be used as a clustering method. Here, the k-means clustering algorithm will be described as an example.

The k-means clustering algorithm is a clustering method based on a distance. And clusters feature vectors close to each other into the same cluster. Specifically, when there are several data, the number of clusters is set as k and centers of the clusters are arbitrarily set.

The number of clusters according to an embodiment is the number of clustered defect types. Distances to the centers of the k clusters for the respective feature vector itself are obtained and the feature vectors belong to a cluster closest to the respective feature vectors. Mean distances to the centers of the clusters are newly set from data of the feature vectors by the feature vectors belonging to each cluster. If newly set centers of the clusters are the same as the prior centers of the clusters, the algorithm is terminated. If newly set centers of the clusters are not the same as the prior centers of the clusters, distances to the centers of the clusters for the respective feature vectors are obtained, and the feature vectors are clustered into a cluster closest to the respective feature vectors. The data is classified into the k clusters by the above-mentioned processes. Accordingly, the data can be classified on the basis of k defect types by the feature vectors.

Subsequently, the operation module 124 determines whether a specific defect type occurs in each manufacturing facility. In other words, the operation module 124 determines whether specific manufacturing facilities cause the defects to occur in a predetermined defect analysis region of the semiconductor wafer.

The semiconductor wafers belonging to a plurality of clusters of defect types are classified for each manufacturing facility. That is, processing histories of the semiconductor wafers belonging to the clusters based on the defect types are considered. Here, the number of semiconductor wafers passing through the manufacturing facilities may be dependent on the manufacturing processes of the semiconductor wafers.

The following case is an example. After 1000 semiconductor wafers are tested, 250 semiconductor wafers are found defective. In this example, there may be first to fourth defect types. Vectors are then generated for the 250 semiconductor wafers, and are grouped into four clusters. In addition, all of the facilities required in the manufacturing processes of the semiconductor wafers are assumed to be first to fourth facilities, and the wafers belonging to each cluster are classified for each manufacturing facility. The example of the above-mentioned classification is shown in the following Table 1.

TABLE 1

Example Classification of Defects by Facility

| | First facility | Second facility | Third facility | Fourth facility |
|---|---|---|---|---|
| First defect cluster (100 pieces) | 80 | 40 | 35 | 10 |
| Second defect cluster (40 pieces) | 30 | 30 | 25 | 20 |
| Third defect cluster (60 pieces) | 50 | 25 | 40 | 15 |
| Fourth defect cluster (50 pieces) | 40 | 40 | 35 | 10 |
| Total 250 pieces | 200 | 135 | 135 | 55 |

Referring to Table 1, defective wafers are classified into each of the first to fourth defect clusters. Further, it can be understood that the facilities in which the defective wafers belonging to each cluster pass during the manufacturing processes are different from each other. However, it is difficult to easily recognize the relationship between the facilities with respect to the defect types with the naked eye. That is, it is not apparent which facility causes a specific kind of defect to occur.

Accordingly, the operation module 124 can, according to the embodiment, analyze whether specific defect types occur in each manufacturing facility.

Hereinafter, among the above-mentioned analysis methods, a chi-square analysis method will be described.

The chi-square analysis of each cluster is performed for each manufacturing facility to analyze whether specific defect types occur in each manufacturing facility. For example, the chi-square analyses of the first to fourth defect clusters are performed for the first manufacturing facility to analyze whether specific defect types occur in the first facility. Subsequently, the chi-square analyses of the first to fourth defect clusters are performed for the second manufacturing facility. Sequentially, the chi-square analyses of all clusters are performed for each manufacturing facility. Therefore, significant differences between the manufacturing facilities can be detected with respect to the clusters on the basis of the defect types. That is, facilities having significant differences can be found by the chi-square analysis method, and the facilities having significant differences can be determined as defective facilities. As a result, an engineer can take measures for the facilities having the significant differences. Therefore, it is possible to improve the yield of the semiconductor wafers by taking measures for the facilities that cause the defects to repeatedly occur in a specific region. Furthermore, it is possible to reduce production time of the semiconductor wafers by finding the defective facilities with the semiconductor wafer analysis system according to the embodiment, instead of by naked eye.

Next, a semiconductor wafer analysis system according to another embodiment will be described.

Referring to FIG. 1, after a tester 100 tests semiconductor wafers, a wafer map generation module 110 generates wafer maps. A wafer analysis module 120 divides each wafer map into a plurality of defect analysis regions, and statistically analyzes feature vectors. A data generation module 122 divides each wafer map into a plurality of defect analysis regions, and generates feature vectors having the defect values, which represent at least one defect type occurring in each defect analysis region, as a plurality of component values.

The operation module 124 performs analyses of variance with respect to the feature vectors generated by the data generation module 122 to statistically analyze data of each defect analysis region.

The analyses of variance are performed with the feature vectors that are generated by the data generation module 122. For instance, factors regarded to have an effect on the feature vectors may be the manufacturing facilities in this embodiment. Therefore, an average and standard deviation of the data with respect to each manufacturing facility relating to the feature vectors are calculated and the analyses of variance are performed. In this case, the significant differences of the manufacturing facilities, which are regarded to cause defects to occur in the predetermined defect analysis region of the semiconductor wafer, can be detected in the analysis of variance. An ANOVA (Analysis of Variance) may be used as a method for the analysis of variance. Facilities having significant differences can be found by the ANOVA, and the facilities having significant differences can be determined as defective facilities. When the defective facilities are found, an engineer may take measures to improve the defective facilities and remove the defects. Therefore, it is possible to improve the rate of operation of the facilities and the yield of the semiconductor wafer.

The operation module used for the chi-square analysis, and the operation module used for the ANOVA have been described above. However, the system may include all operation modules, depending on the system configuration.

Figure 4:
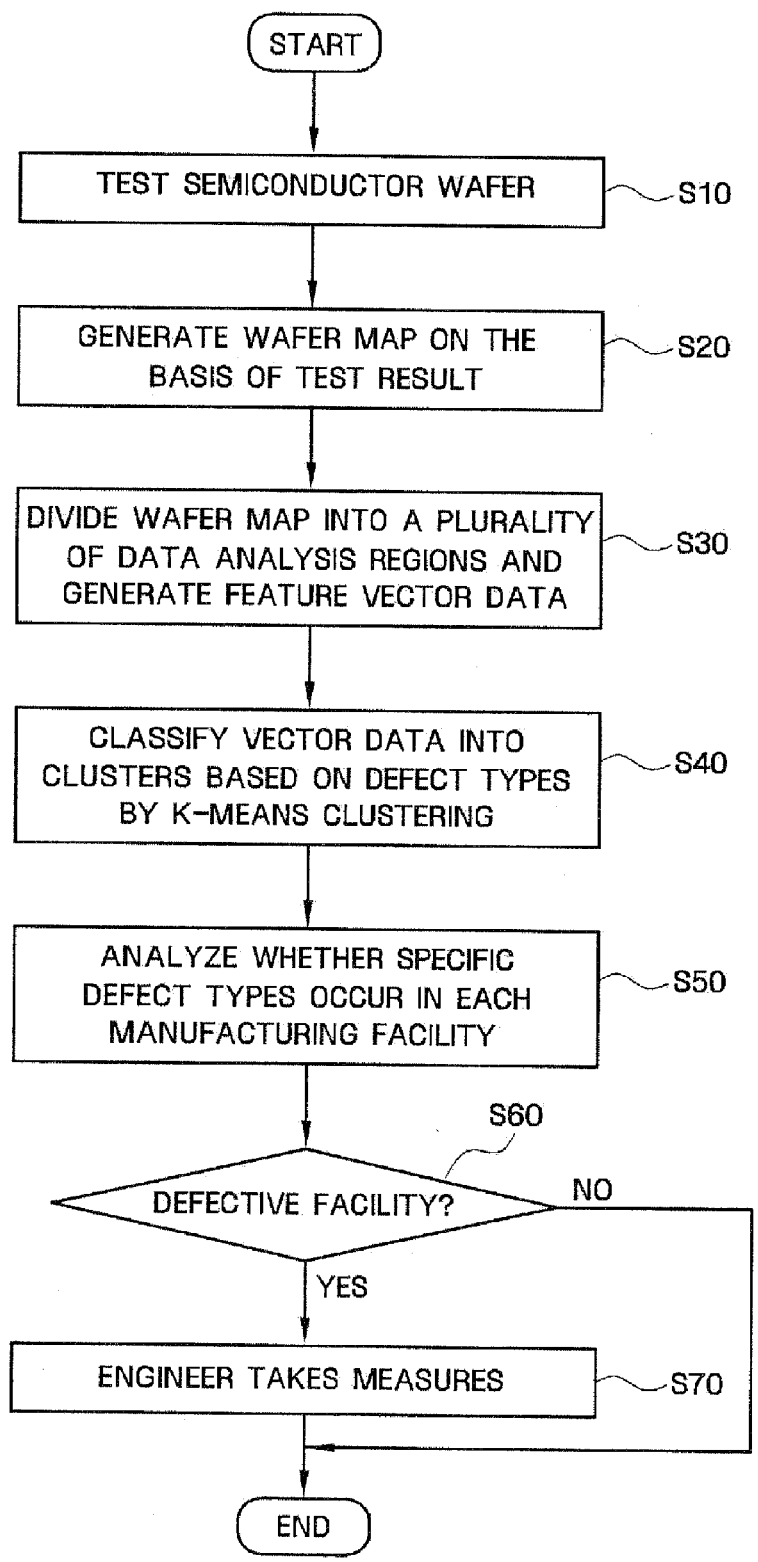
FIG. 4 is a flow chart of an analysis method performed by the semiconductor wafer analysis control system of FIG. 1.

FIG. 4 is a flow chart illustrating an analysis method of the semiconductor wafer analysis system according to the embodiment.

The analysis method of the semiconductor wafer analysis system according to an embodiment will be described with reference to FIGS. 1 to 4.

To begin, a plurality of semiconductor wafers are tested by the tester (S10).

Wafer maps are then generated by the wafer map generation module on the basis of the test results (S20).

Each generated wafer map is divided into a plurality of defect analysis regions, and feature vectors are generated (S30). In generating the feature vectors, as described above, each wafer map is divided into the plurality of defect analysis regions, and the feature vectors having defect values, which represent at least one defect type occurring in each defect analysis region, as a plurality of component values are generated.

In this embodiment, clusters are classified on the basis of the defect type by the k-means clustering of the feature vectors (S40).

The occurrence of specific defect types in each manufacturing facility is analyzed (S50). The wafers, which are classified on the basis of the defect types and belong to each cluster, are classified with respect to the manufacturing facilities. In this classification, processing histories of the semiconductor wafers passing through the manufacturing facilities are considered. Relationships between the facilities are analyzed with respect to each cluster. The chi-square analysis method is used to analyze relationships between two category type parameters.

Whether or not the facilities have significant differences is determined (S60). Determining that the facilities do not have significant differences, the analyses of the semiconductor wafers are terminated. However, determining that they do have significant differences, an engineer may take measures to improve the defective facilities (S70). Then, after the defects of the manufacturing facilities are found, measures are taken to obtain stable data, and the analyses of the semiconductor wafers are terminated.

According to an embodiment, when defects repeatedly occur in specific regions of the semiconductor wafers due to the defects of the manufacturing facilities, it is possible to determine whether the manufacturing facilities have significant differences by the semiconductor wafer analysis system that determines whether the manufacturing facilities are actually defective facilities. Furthermore, the above-mentioned system makes it possible to improve productivity and to reduce time used to find defective facilities.

The semiconductor wafer analysis system according to some embodiments includes the following advantages.

First, it is possible to easily find defective facilities that cause defects to occur in specific regions of semiconductor wafers.

Second, it is possible to reduce production time by easily finding defective facilities.

Third, it is possible to improve the yield of semiconductor wafers by taking measures for defective facilities.

Although the invention has been described in connection with the exemplary embodiments above, it will be apparent to those skilled in the art that various modifications and changes may be made thereto without departing from the scope and spirit of the invention. Therefore, it should be understood that the above embodiments are not limitative, but illustrative in all aspects.

What is claimed is:

1. A semiconductor wafer analysis system comprising:
    a tester adapted to output test results responsive to a test of presence and type of defects on semiconductor wafers manufactured by at least one manufacturing facility;
    a wafer map generation module adapted to generate wafer maps based on the test results from the tester; and
    a wafer analysis module including a data generation module and an operation module, the data generation module adapted to divide each wafer map into a plurality of defect analysis regions and to generate feature vectors having defect values, which representing the semiconductor wafers at least one defect type occurring in each defect analysis region, as a plurality of component values, and the operation module adapted to statistically analyze the feature vectors so as to assist in the determination of a defective one or ore of the manufacturing facilities.

2. The semiconductor wafer analysis system of claim 1, wherein the defect types are category type defects, and the defect values are incidences of the category type defects in the defect analysis regions.

3. The semiconductor wafer analysis system of claim 1, wherein the defect types are parameter type defects, and the defect values are mean values of the parameter values.

4. The semiconductor wafer analysis system of claim 1, wherein the operation module is adapted to perform analyses of variance of the feature vectors to determine which of a plurality of manufacturing facilities cause defects to occur in a specific defect analysis region of the semiconductor wafers.

5. The semiconductor wafer analysis system of claim 4, wherein an ANOVA method is used as the analysis of variance.

6. The semiconductor wafer analysis system of claim 1, wherein the operation module, using a clustering method, is adapted to cluster the feature vectors to classify the feature vectors based on the defect types, and to determine whether a specific kind of defect occurs in each manufacturing facility.

7. The semiconductor wafer analysis system of claim 6, wherein a k-means clustering algorithm, a self-organizing map clustering algorithm, or a hierarchical clustering algorithm is used as the clustering method.

8. The semiconductor wafer analysis system of claim 6, wherein a chi-square analysis method is used to determine whether a specific kind of defect occurs in each manufacturing facility.

9. The semiconductor wafer analysis system of claim 1, wherein each of the defect analysis regions includes at least one chip die.

10. A semiconductor wafer analysis system comprising:
a tester to test semiconductor wafers manufactured by at least one manufacturing facility;
a wafer map generation module to generate wafer maps based on test results from the tester; and
a wafer analysis module that includes a data generation module and an operation module,
wherein the data generation module is adapted to divide each wafer map into a plurality of defect analysis regions and to generates feature vectors representing the semiconductor wafers, and
the operation module is adapted to classify the feature vectors into clusters based on defect type by k-means clustering, and to determine whether a specific kind of defect occurs in each manufacturing facility by a chi-square analysis method.

11. The semiconductor wafer analysis system of claim 10, wherein a plurality of component values of the feature vectors are defect values representing at least one of the defect types occurring in each defect analysis region.

12. The semiconductor wafer analysis system of claim 11, wherein the defect types are category type defects, and the defect values represent the category type defects in the defect analysis regions.

13. The semiconductor wafer analysis system of claim 11, wherein the defect types are parameter type defects, and the defect values are mean values of parameter values of the semiconductor wafers.

14. The semiconductor wafer analysis system of claim 10, wherein each of the defect analysis regions includes a plurality of chip dies.

15. A semiconductor wafer analysis method, comprising:
testing semiconductor wafers manufactured by at least one manufacturing facility;
generating wafer maps based on the testing;
dividing each wafer map into a plurality of defect analysis regions;
generating feature vectors having defect values, which represent at least one defect type occurring in each defect analysis region, as a plurality of component values, wherein the wafer maps visually display the at least one defect type; and
statistically analyzing the feature vectors.

16. The semiconductor wafer analysis method of claim 15, further comprising determining whether a specific manufacturing facility of the at least one manufacturing facility causes defects to occur in the defect analysis regions of the wafers based on the statistical analyzing step.

17. The semiconductor wafer analysis method of claim 16, wherein the determining step includes, for each manufacturing facility, performing a chi-square analysis on feature vector clusters from the data.

18. The semiconductor wafer analysis method of claim 16, wherein the determining step includes, for each manufacturing facility, using an ANOVA (Analysis of Variance) method for analysis of variance of the data.

19. The semiconductor wafer analysis method of claim 15, further comprising the step of clustering a plurality of feature vectors to classify the feature vectors on the basis of the defect type.

20. The semiconductor wafer analysis method of claim 19 wherein the step of clustering a plurality of feature vectors includes using algorithms taken from a group consisting of a k-means clustering algorithm, a self-organizing map clustering algorithm, and a hierarchical clustering algorithm.

* * * * *